(12) United States Patent  
Crotty et al.

(10) Patent No.: US 8,573,159 B1  
(45) Date of Patent: Nov. 5, 2013

(54) SOUND-PRODUCING PET TOY

(71) Applicant: Petstages, Inc., Northbrook, IL (US)

(72) Inventors: Jennifer Crotty, Lake Bluff, IL (US); Jennifer Piety, Deerfield, IL (US)

(73) Assignee: Petstages, Inc., Northbrook, IL (US)

( * ) Notice: Subject to any disclaimer, the term of this patent is extended or adjusted under 35 U.S.C. 154(b) by 0 days.

(21) Appl. No.: 13/667,882

(22) Filed: Nov. 2, 2012

(51) Int. Cl.  
*A01K 29/00* (2006.01)

(52) U.S. Cl.  
USPC .......................................... 119/707

(58) Field of Classification Search  
USPC ................. 119/707, 702, 708, 709, 710, 711; 446/183, 184, 409, 397, 188; 473/571  
See application file for complete search history.

(56) References Cited

U.S. PATENT DOCUMENTS

| | | | |
|---|---|---|---|
| 1,193,992 A * | 8/1916 | Cigol | 473/571 |
| 2,003,958 A | 12/1935 | Salisbury | |
| 3,315,640 A * | 4/1967 | Gamble | 119/707 |
| 4,223,636 A * | 9/1980 | Dishong | 119/709 |
| 5,476,408 A * | 12/1995 | Hoeting et al. | 446/419 |
| 5,560,320 A | 10/1996 | Plunk | |
| 6,112,703 A | 9/2000 | Handelsman | |
| 6,582,274 B1 | 6/2003 | Chernek et al. | |
| 6,892,674 B1 * | 5/2005 | Dubinins et al. | 119/707 |
| 6,918,355 B1 * | 7/2005 | Arvanites | 119/707 |
| 6,935,274 B1 | 8/2005 | Rothschild | |
| 7,587,993 B2 | 9/2009 | Jager | |
| 7,597,065 B2 | 10/2009 | Jager | |
| 7,694,653 B2 | 4/2010 | Axelrod | |
| 7,793,618 B2 | 9/2010 | Edwards et al. | |
| 7,950,352 B2 * | 5/2011 | Specht | 119/707 |
| 8,186,309 B2 * | 5/2012 | Specht | 119/707 |
| 8,205,578 B2 * | 6/2012 | Curry et al. | 119/707 |
| 2004/0092198 A1 * | 5/2004 | Ritchey | 446/71 |
| 2007/0283900 A1 * | 12/2007 | Jager | 119/709 |
| 2008/0280526 A1 | 11/2008 | Chase | |
| 2009/0025648 A1 | 1/2009 | Simon | |
| 2009/0038559 A1 | 2/2009 | Markham | |
| 2009/0038560 A1 | 2/2009 | Markham | |
| 2009/0084325 A1 | 4/2009 | Moskoff | |
| 2010/0199921 A1 | 8/2010 | Haaf et al. | |
| 2011/0005468 A1 | 1/2011 | Piety et al. | |
| 2011/0048338 A1 * | 3/2011 | Specht | 119/709 |
| 2011/0192353 A1 | 8/2011 | Willinger et al. | |
| 2011/0277696 A1 | 11/2011 | Rutherford et al. | |
| 2012/0031348 A1 | 2/2012 | Markham | |
| 2012/0073514 A1 | 3/2012 | Hansen | |
| 2012/0090554 A1 * | 4/2012 | Nunn et al. | 119/707 |

* cited by examiner

*Primary Examiner* — T. Nguyen  
(74) *Attorney, Agent, or Firm* — Greenberg Traurig, LLP

(57) ABSTRACT

A pet toy makes a sound when bitten or squeezed by an animal. The toy contains a resilient shell that substantially surrounds the sound-producing material. The toy also contains a core constructed of an elastic material located beneath the sound-producing material. The sound-producing material is a plastic material such as polyethylene terephthalate, which deforms when external pressure is applied to it, creating sound and vibration. In an embodiment of the invention, air permeates the sound-producing material, the core is hollow, and acoustic ports are located at each end of the toy, all to enhance its sound generating characteristics. In another embodiment, a strand is attached to or passes through the core of the pet toy. In another embodiment, an elastic outer sleeve is attached to the sound-producing material at various location between their surfaces, to reposition the sound-producing material to its original orientation after external pressure is released.

18 Claims, 7 Drawing Sheets

SOUND-PRODUCING PET TOY

FIELD OF THE DISCLOSURE

The present invention is directed to a pet toy, and in particular, to resilient pet toys that creates a crackling sound and/or generates vibration, when a pet squeezes or bites down on the pet toy.

BACKGROUND OF THE DISCLOSURE

Chewable pet toys benefit pets—and, thus, their owners—in various ways. Chewable toys provide enjoyment and distraction for a pet and help to keep the pet occupied when the pet's owner is unavailable. Such toys also directly provide to pets mastication exercise as well as dental sanitation. Chewable pet toys which are compressible are known to enhance these benefits by incorporating an attractant such as pet treats or noise-makers therein.

One known construction of such a noise-making chewable toy incorporates one or more devices that emit sound when the pet chews on or otherwise squeezes the toy due to the passage of air through the devices. These devices, typically known as "squeakers," are usually made of reeds or other similar devices that vibrate when air is passes through them, with the vibration emitting a sound the animal finds attractive. While squeakers are effective at producing sound, they are less effective at producing a vibration for the animal in response to its squeezing the toy.

One known construction of chewable pet toys includes elastic materials that enable the pet toy to be squeezed or bent in response to an animal's bite without the toy deforming or breaking. After the animal is done chewing on the pet toy, it returns to its original shape. Such material is useful in pet toys, because it gives the animal a sensation of chewing, without destroying the pet toy. However, elastic materials are not known to make noise or create a vibration for the animal chewing a toy constructed of it.

Other materials used in chewable pet toys are not elastic, but rather exhibit plasticity. Such "plastic" materials do not readily break when external force is applied, nor are they elastic. Rather, plastic materials deform with external pressure such as a pet biting down on it. When such deformation occurs, it creates a "crackling" noise and vibration that is attractive to the animal. One such known plastic material is polyethylene terephthalate (PET), commonly used in constructing plastic soda bottles.

PET bottles are known to be used in association with pet toys. However, there are several concerns with its use. PET cannot withstand the piercing force of a dog bite, and will readily puncture and break, thus reducing the life of the toy and may further pose a hazard to the animal with exposed edges and shards of PET. It is also preferable to isolate direct exposure with PET from the dog due to potential chemicals in that plastic material. Furthermore, PET must be relatively thin in order to deform to cause the desired noise and vibration of a pet toy. Such thin PET can break if it is not supported by a solid material beneath it. While a sealed PET bottle may offer some support through its sealed air pressure, it is insufficient to withstand the repeated biting and chewing by a large dog. Particularly, the PET becomes less and less effective as a sound and vibration generator if it is permitted to migrate, over repeated bites, to a collapsed orientation, without repositioning it back to most of its original pre-bite shape. Further, a sealed PET bottle can be pierced by a strong-enough bite.

It would be desirable to provide a pet toy containing a plastic material component that deforms to creates a crackling noise and vibration, yet is protected from an animal's bite such that the plastic will not puncture or break. At the same time, it is desirable to provide a construction in which the PET is returned to its original orientation, before deformation by an animal's bite, to enhance repeated sound and vibration generation, in the environment of a dependable, yet safe and durable, pet chew toy.

SUMMARY OF THE INVENTION

The present invention comprises a sound-producing pet toy apparatus. In one embodiment, the sound-producing pet toy apparatus includes an elastic core having an outside surface, and a crackling member having an inside and an outside surface. The crackling member is positioned with the inside surface of the crackling member substantially adjacent to the outside surface of the elastic core. The sound-producing pet toy apparatus also includes a resilient outer shell member substantially encircling the crackling member and the elastic core, the shell having an inside and an outside surface, the inside surface of the shell being positioned about the outside surface of the crackling member in a first configuration. The apparatus has a second configuration in which at least a portion of the crackling member and elastic core are deformed by a force applied to the resilient outer shell, the crackling member producing at least one of a sound and a vibration upon deformation. Upon release of the applied force, the elastic core reshapes the apparatus toward its first configuration, the crackling member again producing at least some sound and/or vibration, as the elastic core, the crackling material and the shell substantially return to the first configuration.

In some preferred embodiments, the resilient outer shell is constructed an elastic material.

In some preferred embodiments, the shell and the core are constructed of the same elastic material.

In yet other preferred embodiments, air is disposed between the core and shell, adjacent to at least one of the inside and outside surfaces of the crackling member.

In some preferred embodiments, the crackling member comprises one or more layers of a sound-producing material.

In some preferred embodiments, the one or more layers of sound-producing material comprise polyethylene terephthalate (PET).

In some preferred embodiments, the crackling member comprises a sheet of sound-producing material overlapping itself.

In other preferred embodiments, the one or more layers of sound-producing material include textured portions to avoid nesting, to, in turn, promote greater sound and vibration. In these embodiments in which one layer of sound-producing material overlaps another layer of sound-producing material, the textured portions substantially space apart the layers of sound-producing material from each other.

In some preferred embodiments, the outer shell contains at least one acoustic port.

In some preferred embodiments, the core contains at least one acoustic port, the at least one acoustic port in the core being aligned with the at least one acoustic port in the shell. In some preferred embodiments, the shell includes two acoustic ports disposed at opposite ends of the shell. In some preferred embodiments, the core includes two acoustic ports disposed at opposite ends of the core, each of the acoustic ports in the core being aligned with one of the acoustic ports in the shell. In some preferred embodiments, the core includes an inside surface that extends between each of the acoustic ports at opposite ends of the core.

In some preferred embodiments, the sound-producing pet toy apparatus further includes a strand operably disposed at least partially within the core. In some of these embodiments, at least a portion of the strand includes one or more filaments of sound-producing material, such as PET, to further generate sound and vibration, upon deformation by a pet.

In the preferred embodiments, at least a portion of the crackling member plastically deforms to produce a sound when the shell is deformed.

The present invention also comprises a sound-producing pet toy apparatus including an outer shell constructed of an elastic material, the outer shell having an inner surface, and a crackling member constructed of a plastic material, the crackling member having an outer surface which is substantially, restrainably fixed relative to the inner surface of the elastic outer shell. Prior to being chewed by a pet, the outer shell and the crackling member are oriented relative to each other in a first configuration of the apparatus. At least a portion of the crackling member deforms and produces at least one of a sound and a vibration when at least a portion of the inner surface of the outer shell elastically deforms to a second configuration of the apparatus. At least a portion of the crackling member deforms and produces at least one of a sound and a vibration when the elastically deformed portion of the inner surface of the outer shell substantially returns to the first configuration, as prompted by the elasticity of the outer shell.

In some preferred embodiments, the sound-producing pet toy apparatus includes a durable, elastic core member positioned within the crackling member for facilitating the return of the crackling member to its first configuration.

In some preferred embodiments, the outer shell substantially encases the crackling member, the crackling member substantially restrainably affixed to the outer shell at a plurality of points between the outer surface of the crackling member and the inner surface of the outer shell.

In some preferred embodiments, the crackling member is restrainably attached to the outer shell by spot welds or intermittent adhesive attachments.

In some preferred embodiments, the crackling member is restrainably attached to the outer shell by one or more extended regions of lamination. In some of these embodiments, the crackling member is restrainably attached to the outer shell by lamination of the outer surface of the crackling member to the inner surface of the outer shell, wherein the lamination is achieved through adhesive or other affixation therebetween.

DETAILED DESCRIPTION OF THE INVENTION

Figure 1:
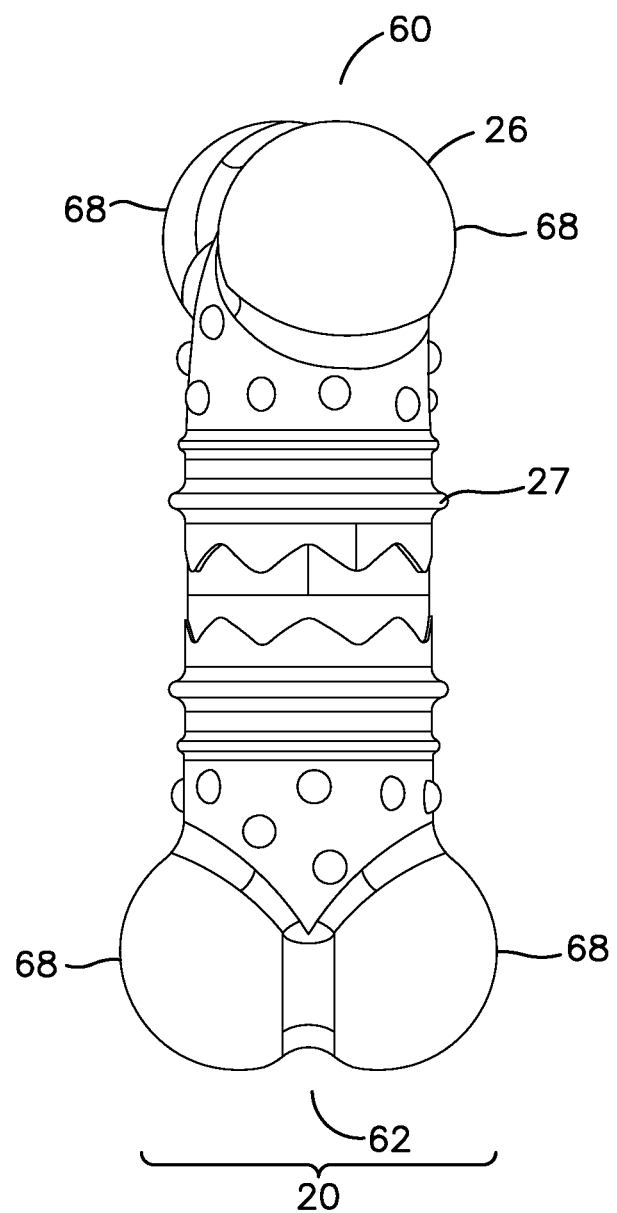
FIG. 1 is a perspective view of the pet toy according to a preferred embodiment of the invention.
Figure 2:
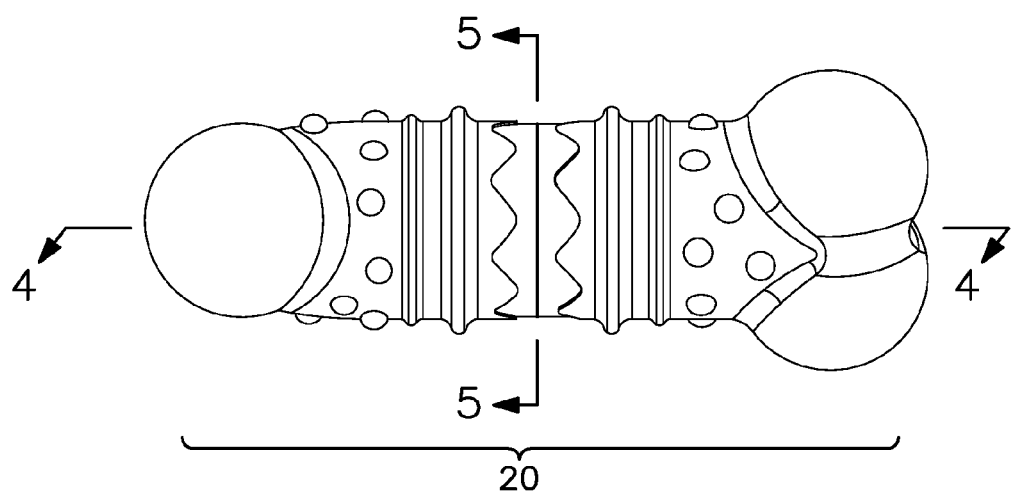
FIG. 2 is a side view of the pet toy according to the embodiment of FIG. 1, laying in a horizontal position.
Figure 3:
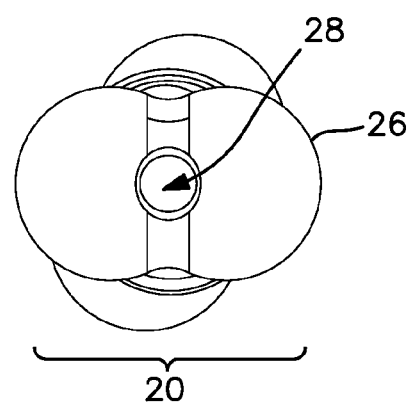
FIG. 3 is an end view of the pet toy according to the embodiment of FIG. 1.

While this invention is capable of embodiment in many different forms, there is shown and described in the drawings and associated text, a specific embodiment, with the understanding that the present disclosure is to be considered an exemplification of the principles of the invention and is not intended to limit the invention to the embodiment illustrated.

The following description and drawings are illustrative and are not to be construed as limiting. Numerous specific details are described herein to provide a thorough understanding of the disclosure. However, in certain instances, well-known or conventional details may not be described in order to avoid obscuring the description. References to one, or an, embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure.

It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

For purposes of this detailed description, it is envisioned that in one example of use of the invention, a dog will be holding the pet toy in its mouth, and pressing down on the shell layer of the toy with its teeth. During this process, the dog would bite down on the pet toy, which would then produce a crackling noise in addition to a vibration felt by the dog, to provide both audible and tactile feedback to the dog. This description is not meant to limit the scope of the claims, but rather to describe one embodiment of the invention.

Pet toy 20, as shown in FIGS. 1-5, comprises core 22, crackling member or layer 24 and shell 26. Pet toy 20 may take the form of many different shapes. The embodiment shown in FIGS. 1-5 is in the shape of a bone.

Figure 4:
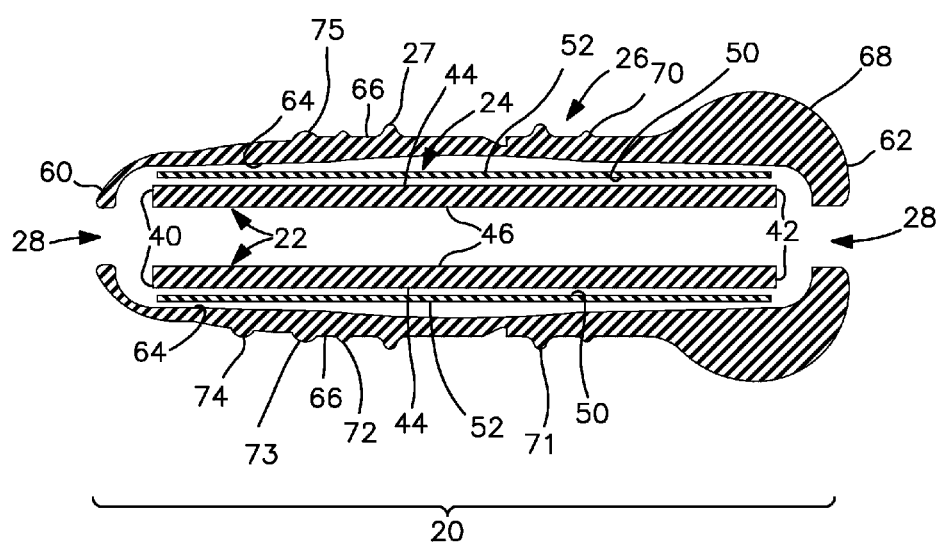
FIG. 4 is a cross sectional view of the pet toy according to the embodiment of FIG. 1, taken along lines 4-4 of FIG. 2, and looking in the direction of the arrows, showing the core, crackling, and shell layers of the pet toy.

In a preferred embodiment as shown in FIG. 4, core 22 has a generally cylindrical, hollow tube shape between first end 40 and second end 42, defining generally cylindrical outside surface 44 and generally cylindrical inside surface 46. In some embodiments, outside surface 44 and inside surface 46 are substantially continuous. It should be understood that, according to the principles of the present disclosure, core 22 can have a variety of configurations. While core 22 is shown as hollow in FIG. 4, in one particular embodiment, core 22 need not be hollow. Core 22 is constructed of a durable material that may also be resilient such as thermoplastic elastomer, silicone, fluorosilicone, polyethylene or a similar elastic material, and may be molded in one or more parts. Core 22 may also be constructed of materials having varying degrees of deformability.

Figure 7:
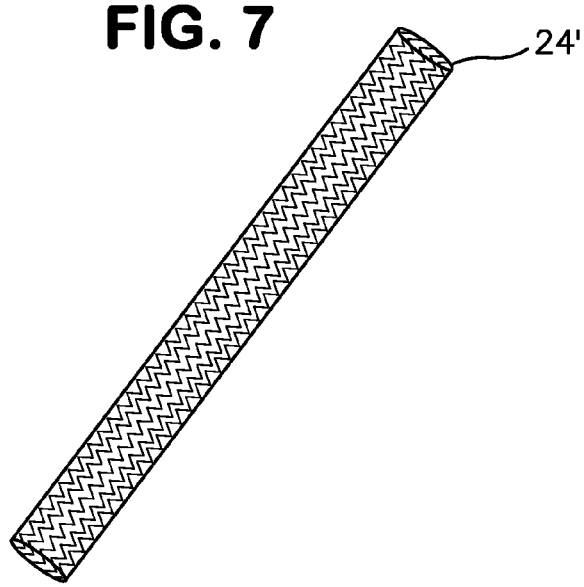
FIG. 7 is a perspective view of the crackling layer of the pet toy according to the embodiment of FIG. 6.
Figure 10:
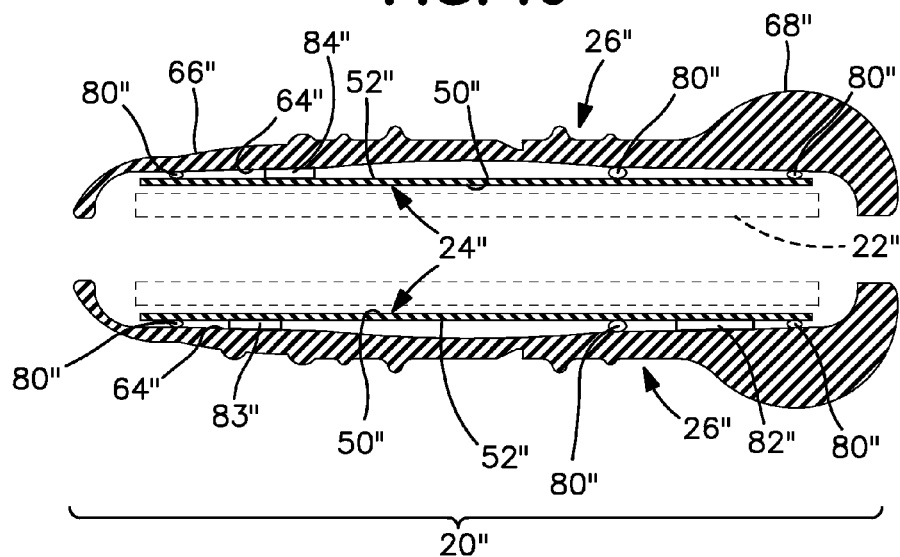
FIG. 10 is a cross sectional view of the pet toy, similar to the view of FIG. 4, in another embodiment of the invention that includes an elastic shell and a crackling member, with or without the core member shown in phantom.

Crackling member or layer 24 comprises one or more substantially flat sheets of plastic material that are rolled, or otherwise situated, about outside surface 44 of core 22. In should be understood that the cross-sectional view of crackling layer 24 shown in FIG. 4, and the similar view of crackling layer 24" in the alternative embodiment illustrated in FIG. 10, are each illustrated with the crackling layer having a single, relatively thick layer, to exemplify the structure and configuration of the respective embodiments of the pet to according to the principles of the present disclosure, and that these exemplary illustrations of these crackling layers are examples of the variety of configurations of crackling layers according to the principles of the present disclosure, which variety also includes the layered configuration illustrated in FIG. 5. Alternatively, in other embodiments, such as shown in FIG. 7, crackling layer 24' can be formed of textured, ridged, or undulating sound-emitting plastic material. Crackling layer 24 is constructed of one or more layers of a sound-producing material that exhibits plasticity, such that the material will deform when external pressure is applied. One example of such material is polyethylene terephthalate (PET). PET is commonly used as a material for disposable plastic soda bottles. Among its other properties, PET is "plastic," meaning it will deform when external pressure is applied. When PET is deformed, a crackling sound is made, and a vibration is generated that can be sensed by the animal applying the force that caused the deformation. The PET or other suitable material may be deformed repeatedly, each time generating the desired sound and vibration. Crackling layer 24 may contain one or more layers of PET or other suitable material, that may be wrapped around core 22.

Figure 5:
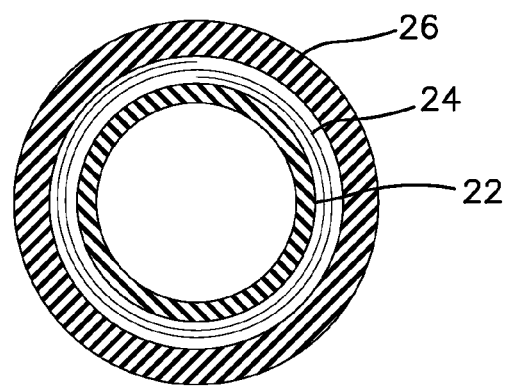
FIG. 5 is a cross sectional view of the pet toy according to the embodiment of FIG. 1, taken along lines 5-5 of FIG. 2, and looking in the direction of the arrows, showing the core, crackling, and shell layers of the pet toy.

In another preferred embodiment of the invention as shown in FIG. 5, the area of the sheet of plastic material used in crackling layer 24 exceeds that of outside surface 44, such that crackling layer 24 may wrap around itself, outside surface 44, more than one time. Crackling layer 24 comprises inside surface 50 that may come into contact with outside surface 44 of core 22, and outside surface 52 that may come into contact with inside surface 64 of shell 26.

Shell 26 substantially encases crackling layer 24, and is shown in FIGS. 1-5. It should be understood that a pet toy according to the principles of the present invention may include additional layers within shell 26. For example, a toy according to the principles of the present disclosure with the construction illustrated in FIGS. 1-4 could include additional crackling layers, and other intermediate layers therebetween, to provide a larger toy as well as varying or enhanced sounds and vibrations.

Shell 26, as shown in FIG. 4, comprises a first end 60, second end 62, an inside surface 64 and an outside surface 66. Inside surface 64 is shaped in a generally cylindrical manner, mirroring the tube shape of outside surface 44 of core 22, although with a larger diameter and length, to enable crackling layer 24 and core 22 to substantially fit inside shell 26. As shown in the preferred embodiment of FIG. 1, shell 26 may also comprise additional texture elements, such as ring 27, located along outside surface 44. Other rings or ridges 70, 71 and 72, and protrusions 73, 74 and 75 can be utilized to stimulate the dog's gums.

Shell 26 may further comprise one or more bone-shaped extremities 68 located at first end 60 and/or second end 62. Extremities 68 may be arranged in an offset configuration, as illustrated in FIGS. 1-5, and may act to keep the remainder of shell 26 from touching the ground, and to inhibit fluids such as dog drool from entering acoustic port 28, located at first end 60 and/or second end 62. It should be understood that, a pet toy according to the principles of the present disclosure can have a variety of configurations, including multiple bone-shaped (or otherwise shaped) extremities being aligned or in a coplanar arrangement.

Figure 11:
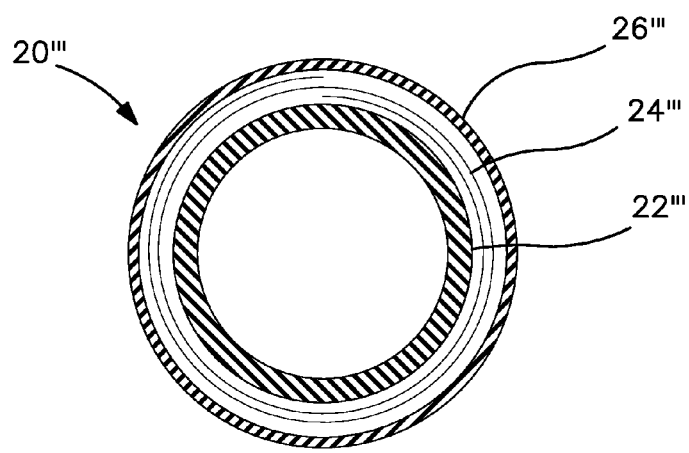
FIG. 11 is a cross sectional view of the pet toy, similar to the view of FIG. 5, in another embodiment of the invention, wherein the shell is constructed of a resilient but inelastic material such as a woven fabric.

Suitable materials of construction for shell 26 include thermoplastic elastomer, silicone, fluorosilicone, polyethylene, or a similar durable and elastically deformable material, that may be molded into one or more parts. Core 22 may be constructed of the same material as shell 26. When paired with a core component comprising an elastic material, suitable materials of construction of shell 26 also include rope material, woven fabrics, or other durable materials. Indeed, as illustrated in the alternative embodiment of FIG. 11, pet toy 20''', shell 26''' comprises a different, relatively thinner material than core 22'''—such as a woven fabric.

Referring again to FIGS. 1-5, when external force or pressure, such as that which is expected from a dog's bite, is applied to pet toy 20 in its initial or first unbitten orientation or configuration while under no force, this bite force comes into contact with outside surface 66 of shell 26. Resilient shell 26 then dissipates and transfers the force of a piercing bite, such that the bite will not puncture shell 26 or crackling layer 24. The force of the bite will cause pet toy 20 to have a second orientation or configuration in which inside surface 64 of shell 26 to presses down on outside surface 52 of crackling layer 24, which in turn causes inside surface 50 of crackling layer 24 to press down on outside surface 44 of core 22. The force on outside surface 44 of core 22 is, at least in part, returned to inside surface 50 of crackling layer 24, thus focusing the force from the dog's bite on crackling layer 24. The force of the dog's bite acts to deform a portion of crackling layer 24, and creates the desired crackling sound and vibration. Shell 26 and core 22 are sufficiently durable to withstand the pressure of a dog's bite and will transfer at least a portion of the force of the dog's bite to the crackling layer 24, rather than absorb all such force. Furthermore, shell 26 acts to prevent a dog's bite from directly contacting crackling layer 24, which may cause one or more layers of PET in crackling layer 24 to break, or leech PET chemicals to the dog's teeth, gums or tongue. Finally, when the bite force is released, as at least one of core 22 and shell 26 is constructed of an elastic material, the memory return functionality of the one or more elastic components operates to return pet toy 20 to the first orientation or configuration. In the return action, the crackling layer 24 again deforms as it returns to the majority of its original orientation to produce yet additional crackling sound and vibration.

In the preferred embodiment of the invention as shown in FIGS. 4 and 5, there is air in between core 22 and shell 26. It is believed that air assists in transmitting the sound generated by crackling layer 24. For this reason, additional space between core 22 and shell 26 is provided, to allow air to permeate crackling layer 24. It should be understood that, in alternative embodiments of a pet toy according to the principles of the present disclosure, the core and shell components may be coupled to each other so as to prevent or inhibit the passage of air therebetween, and that pet toy may be configured without air between those components.

In a preferred embodiment of the invention as shown in FIGS. 4 and 5, core 22 has inside surface 46, and is thus substantially hollow. It is believed that a substantially hollow core 22 also assists in transmitting the noise generated by the deformations in crackling layer 24. In addition, when core 22 is substantially hollow, shell 26 may further comprise one or more acoustic ports 28. Acoustic port 28 comprises at least one a hole in shell 26 and/or core 22, that also allows sound to travel from crackling layer 24 where it is generated, to the outside where it may be heard, and is shown in particular in FIGS. 3 and 4. While acoustic port 28 is shown in combination with a substantially hollow core 22, it may also be utilized with a solid core 22 in another embodiment of the invention. It is believed that acoustic port 28 enhances the sound produced by crackling layer 24, such that it generates even more sound and vibration. While acoustic ports 28 may be located anywhere on shell 26 and core 22, in a preferred embodiment acoustic ports 28 are located at either end of shell 26.

Figure 6:
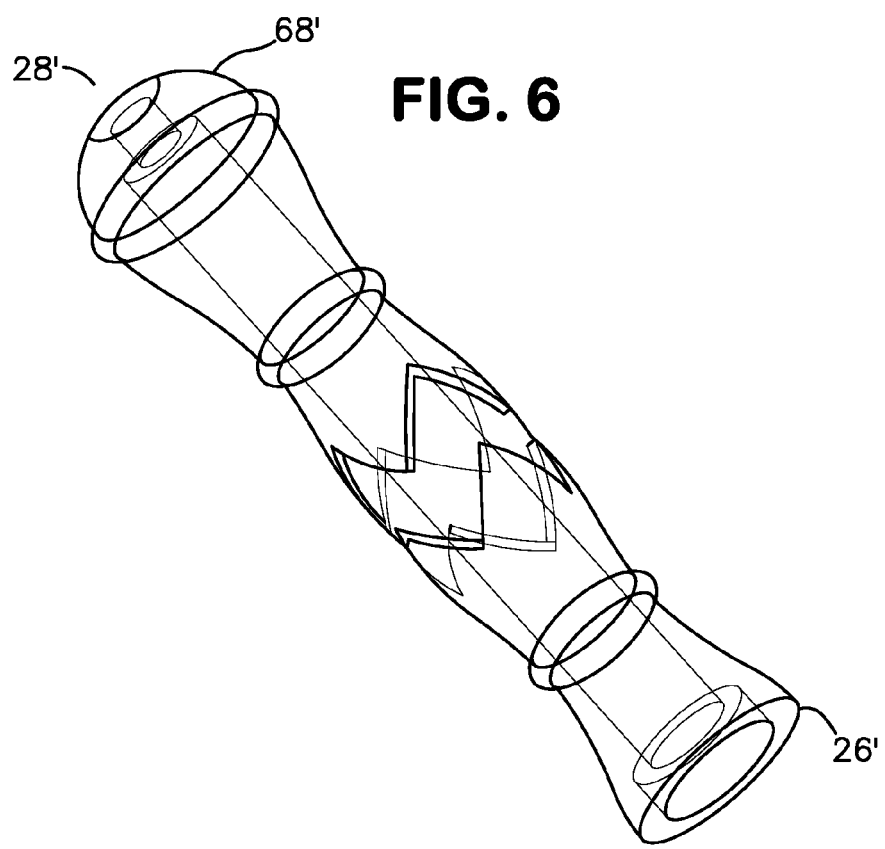
FIG. 6 is a perspective view of the shell layer of the pet toy, in phantom, according to another embodiment of the invention, showing the outer and inner surface of the shell layer.

In an alternative embodiment of the invention as shown in FIG. 6, shell 26' is in the shape of a small barbell with varying thicknesses along the length of shell 26'. In this embodiment, extremities 68' are in the shape of small barbell ends, and, as set forth above with regard to extremities 68, similarly act to prevent most of shell 26' from touching the ground, and inhibit the flow of any dog drool from entering acoustic port 28'.

In an embodiment of the invention as shown in particular in FIG. 7, the one or more layers of sound-producing PET material of the crackling member or layer 24' are textured, such that when force is applied to deform the sound-producing material, the material may deform in multiple locations among the material, enhancing the noise and vibrations made in the deformation, and enhancing the life of the sound-producing material by allowing for additional places for new deformations in the material, with repeated use. In addition, the textured portions of the sound-producing material of crackling member or layer 24' are less likely to lie flat against one another, as the textured portions space apart the layers of material, and thus assist in enabling air to permeate within crackling layer 24'.

Figure 8:
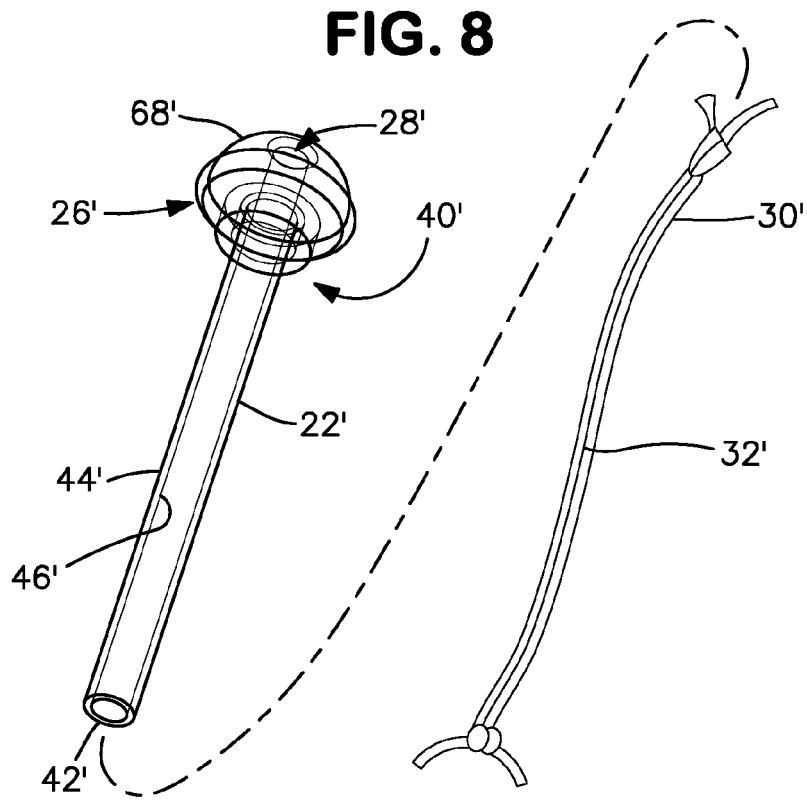
FIG. 8 is a perspective view of the core layer and strand of the pet toy according to the embodiment of FIG. 6, showing the outer and inner surface of the core layer.
Figure 9:
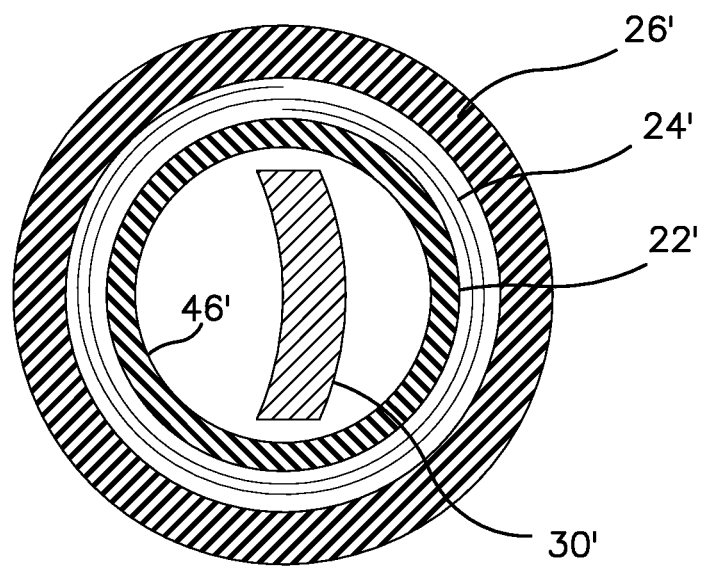
FIG. 9 is a cross section of the pet toy according to the embodiment of FIGS. 6 and 8.

In an embodiment, as shown in FIG. 8, core 22' may be constructed to include a portion of shell 26' in one piece. It should be understood that, in in this and other alternative embodiments of a pet toy according to the principles of the present disclosure, the core and shell components may be sealed to one another so as to prevent or inhibit the passage of air therebetween. Furthermore, the pet toy may include strand 30', located at least partially inside core 22'. In an embodiment of the invention as shown in particular in FIGS. 8 and 9, strand 30' comprises a length of flexible material, which could include one or more filaments of PET or other sound-producing material 32', which passes through and/or attaches to inside surface 46' of core 22'. Strand 30' may be used by a person or a dog to pick up, carry or throw a pet toy according to the principles of the present disclosure without touching shell 26', and may also be visually attractive. Suitable materials for strand 30' include, among others, ribbon, cord, rope, or canvas.

In another alternative embodiment as shown in FIG. 10, a pet toy 20" includes an elastic shell 26" and plastic crackling member 24", with or without a core member 22", illustrated in phantom in FIG. 10. Crackling member 24" is fixed relative to elastic shell 26" at attachment points 80", or attachment regions 82", 83" and 84"—which can be comprised of one of variety of conventional adhesive attachment points or welds, that may be tacked or tack welded. Alternatively, the PET can be laminated by adhesive or welded to elastic shell 26", by extending attachment regions 82", 83" and/or 84" over a larger region of the surfaces between shell 26" and crackling member 24". According to the principles of the present invention, when elastic shell 26" deforms from a first configuration, under no force, to a second, deformed configuration upon biting, when crackling member 24" deforms to produce a sound and a vibration. When elastic shell 26" substantially returns to the first configuration after the biting force is removed, elastic shell 26" prompts the shape of crackling member 24" to substantially its original shape as a result of the affixation of crackling member 24" to elastic shell 26". At that time, yet additional crackling sound and vibration is generated.

In another embodiment of the invention, a resilient and/or elastic core member can likewise be positioned within the layer of crackling material to enhance the return of the crackling material back to its pre-bite position—while generating yet further sound and tactile vibration.

The foregoing description and drawings merely explain and illustrate the invention, and the invention is not limited thereto, except as those skilled in the art who have the present disclosure before them will be able to make modifications and variations therein without departing from the scope of the invention.

What is claimed is:

1. A sound-producing pet toy apparatus comprising:
   an elastic core having an outside surface;
   a crackling member having an inside and an outside surface, the crackling member being positioned with the inside surface of the crackling member substantially adjacent to the outside surface of the elastic core; and
   a resilient outer shell member substantially encircling the crackling member and the elastic core, the shell having an inside and an outside surface, the inside surface of the shell being positioned about the outside surface of the crackling member in a first configuration;
   the apparatus having a second configuration in which at least a portion of the crackling member and elastic core are deformed by a force applied to the resilient outer shell, the crackling member producing at least one of a sound and a vibration upon deformation; and
   upon release of the applied force, the elastic core reshapes the apparatus toward its first configuration, the crackling member again producing at least one of a sound and a vibration, as the elastic core, the crackling material and the shell substantially return to the first configuration.

2. The pet toy apparatus of claim 1, wherein the resilient outer shell is constructed of an elastic material.

3. The pet toy apparatus of claim 2, wherein the shell and the core are constructed of the same elastic material.

4. The pet toy apparatus of claim 1, wherein air is disposed between the core and shell, adjacent to at least one of the inside and outside surfaces of the crackling member.

5. The pet toy apparatus of claim 1, wherein the crackling member comprises one or more layers of a sound-producing material.

6. The pet toy apparatus of claim 5, wherein the one or more layers of sound-producing material comprise polyethylene terephthalate (PET).

7. The pet toy apparatus of claim 5, wherein the crackling member comprises a sheet of sound-producing material overlapping itself.

8. The pet toy apparatus of claim 5, wherein the one or more layers of sound-producing material include textured portions.

9. The pet toy apparatus of claim 8, in which one layer of sound-producing material overlaps another layer of sound-producing material, wherein the textured portions substantially space apart the layers of sound-producing material from each other.

10. The pet toy apparatus of claim 1, wherein the outer shell contains at least one acoustic port.

11. The pet toy apparatus of claim 10, wherein the core contains at least one acoustic port, the at least one acoustic port in the core being aligned with the at least one acoustic port in the shell.

12. The pet toy apparatus of claim 10, wherein the shell includes two acoustic ports disposed at opposite ends of the shell.

13. The pet toy apparatus of claim 12, wherein the core includes two acoustic ports disposed at opposite ends of the core, each of the acoustic ports in the core being aligned with one of the acoustic ports in the shell.

14. The pet toy apparatus of claim 13, wherein the core includes an inside surface that extends between each of the acoustic ports at opposite ends of the core.

15. The pet toy apparatus of claim 14, further comprising a strand operably disposed at least partially within the inside surface of the core.

16. The pet toy apparatus of claim 1, further comprising a strand extending at least partially within the core.

17. The pet toy apparatus of claim 16, wherein at least a portion of the strand includes one or more filaments of sound-producing material, to generate at least one of a sound and a vibration upon deformation.

18. The pet toy apparatus of claim 17, wherein the strand is made of a polyethylene terephthalate (PET) material.

* * * * *